(12) United States Patent
Xu (10) Patent No.: US 9,756,227 B2
(45) Date of Patent: Sep. 5, 2017

(54) SPORT CAMERA SYSTEMS AND ASSOCIATED HOUSING STRUCTURE

(71) Applicant: Chengdu CK Technology CO., LTD., Chengdu (CN)

(72) Inventor: Wen-cai Xu, Chengdu (CN)

(73) Assignee: Chengdu CK Technology CO., LTD., Chengdu (CN)

( * ) Notice: Subject to any disclaimer, the term of this patent is extended or adjusted under 35 U.S.C. 154(b) by 0 days.

(21) Appl. No.: 15/165,919

(22) Filed: May 26, 2016

(65) Prior Publication Data

US 2016/0373622 A1    Dec. 22, 2016

(30) Foreign Application Priority Data

Jun. 16, 2015   (CN) .......................... 2015 1 03322247

(51) Int. Cl.
| | |
|---|---|
| *H04N 5/225* | (2006.01) |
| *H04N 5/232* | (2006.01) |
| *G03B 17/02* | (2006.01) |
| *G03B 17/56* | (2006.01) |

(52) U.S. Cl.
CPC .......... *H04N 5/2252* (2013.01); *G03B 17/02* (2013.01); *G03B 17/568* (2013.01); *H04N 5/23293* (2013.01); *G03B 2217/002* (2013.01)

(58) Field of Classification Search
CPC .............. H04N 5/2251; H04N 5/2252; H04N 5/23203; H04N 5/23206; G03B 17/02–17/17; G03B 17/56; G03B 17/568
See application file for complete search history.

(56) References Cited

U.S. PATENT DOCUMENTS

| | | | |
|---|---|---|---|
| 8,837,928 B1 * | 9/2014 | Clearman ........... | E05B 17/2019 206/316.2 |
| 2006/0170649 A1 * | 8/2006 | Kosugi .................. | G04G 21/08 345/156 |
| 2016/0210717 A1 * | 7/2016 | Adsumilli ............. | G06T 1/0028 |
| 2016/0277688 A1 * | 9/2016 | Gaskamp ............... | H04N 5/332 |

* cited by examiner

*Primary Examiner* — Paul Berardesca
(74) *Attorney, Agent, or Firm* — Perkins Coie LLP (57) ABSTRACT

The present disclosure relates to a camera system that can be used to capture outdoor images. The camera system is easy to manufactured, operated, and maintained. The camera system includes an internal structure and an external structure. The internal structure includes multiple components such as an image component, a storage component, a communication component, a power supply component, and a processor. The external structure is configured to cover and/or protect the internal structure and the components therein. The external structure can be a housing structure with a front housing and a back housing. The external structure can include multiple patterns positioned thereon so as to form a gripping area that facilitates a user to properly hold the camera system.

20 Claims, 7 Drawing Sheets

SPORT CAMERA SYSTEMS AND ASSOCIATED HOUSING STRUCTURE

CROSS-REFERENCE TO RELATED APPLICATIONS

This application claims the benefit of Chinese Patent Application No. 2015103322247, filed Jun. 16, 2015 and entitled "A DEVICE FOR SHOOTING OUTDOOR SPORT VIDEO AND PICTURES," the contents of which are hereby incorporated by reference in its entirety.

BACKGROUND

It has become more and more popular using sports cameras to collect images of outdoor activities. To be able to properly collect outdoor images, a suitable sports camera should be convenient to carry, easy to operate, and durable under various ambient conditions. To provide proper protection for a sports camera, a suitable enclosure system is necessary. It is also important how to position and arrange related components (such as a camera lens, display, etc.) of the sports camera such that the sports camera can be operated and carried by a user in a convenient way. Therefore, it is advantageous to have a camera system that can provide above-mentioned functions.

BRIEF DESCRIPTION OF THE DRAWINGS

Embodiments of the disclosed technology will be described and explained through the use of the accompanying drawings.

FIGS. 2-7 are schematic diagram illustrating various views of a sports camera in accordance with embodiments of the disclosed technology. More particularly, FIG. 4 is a top view of the sports camera in accordance with embodiments of the disclosed technology.

The drawings are not necessarily drawn to scale. For example, the dimensions of some of the elements in the figures may be expanded or reduced to help improve the understanding of various embodiments. Similarly, some components and/or operations may be separated into different blocks or combined into a single block for the purposes of discussion of some of the embodiments. Moreover, although specific embodiments have been shown by way of example in the drawings and described in detail below, one skilled in the art will recognize that modifications, equivalents, and alternatives will fall within the scope of the appended claims.

DETAILED DESCRIPTION

In this description, references to "some embodiment", "one embodiment," or the like, mean that the particular feature, function, structure or characteristic being described is included in at least one embodiment of the disclosed technology. Occurrences of such phrases in this specification do not necessarily all refer to the same embodiment. On the other hand, the embodiments referred to are not necessarily mutually exclusive.

The present disclosure relates to a camera system that can be used to capture outdoor images. The camera system is easy to manufactured, operated, and maintained. The camera system includes an internal structure and an external structure. The internal structure includes multiple components such as an image component (e.g., an image sensor and a lens component), a storage component (e.g., a hard drive or a memory), a communication component, a power supply component (e.g., a battery), a processor (e.g., a central processing unit, CPU), etc. The external structure is configured to cover and/or protect the internal structure and the components therein. In some embodiments, the external structure can be a housing structure (e.g., a front housing and a back housing). In other embodiments, the external structure can be other suitable structures that can protect the components in the camera system and facilitate the camera system's operation (e.g., it can provide a gripping area (or gripping surface) that facilitates a user's grip and control of the camera system). The external structure can include multiple patterns positioned thereon so as to form a gripping area that facilitates a user to properly hold the camera system. In some embodiments, the pattern can be formed by multiple openings that are positioned or aligned in a certain way (e.g., as an array).

In some embodiments, the external structure can include multiple properly-designed openings so as to enable the components in the internal structure can communicate or interact with a system user. For example, in some embodiments, multiple antenna feed points can be positioned on the external structure and electrically coupled to the internal structure. This configuration enables a system user to conveniently and quickly connect the camera system with an external antenna via the antenna feed points. As another example, multiple battery feed points can be positioned on the external structure and electrically coupled to a battery in the internal structure. This configuration enables a system user to conveniently and quickly connect the camera system with an external battery or a power source via the battery feed points.

Figure 1:
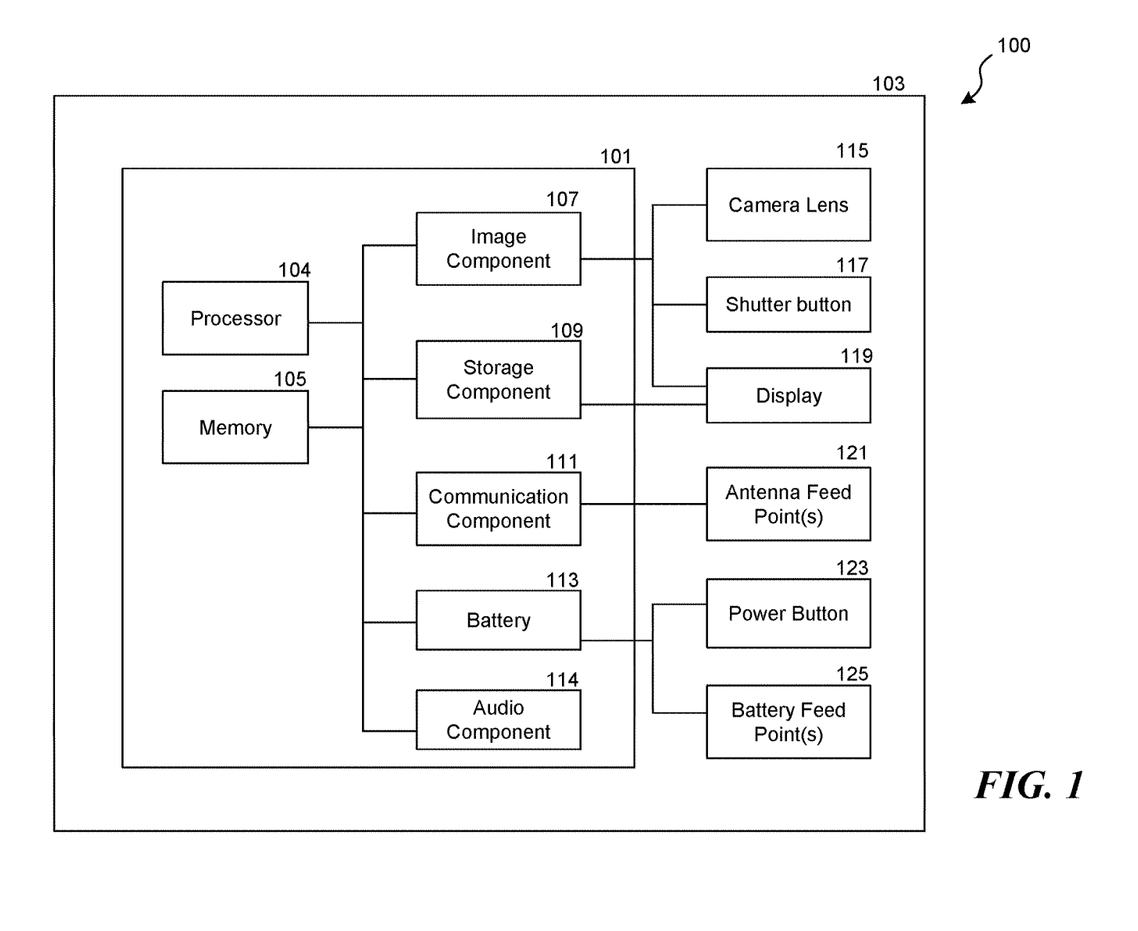
FIG. 1 is a schematic diagram illustrating a system in accordance with embodiments of the disclosed technology.

FIG. 1 is a schematic diagram illustrating a system 100 in accordance with embodiments of the disclosed technology. The system 100 includes an internal structure 101 and an external structure 103. The external structure 103 is configured to cover and protect the internal structure 101. The internal structure 101 can include multiple components that are configured to operate the system 100. These components include a processor 104, a memory 105, an image component 107, a storage component 109, a communication component 111, a battery 113 and an audio component 114. The processor 104 is configured to control the memory 105 and other components (e.g., components 107-125) in the system 100. The memory 105 is coupled to the processor 104 and configured to store instructions for controlling other components in the system 100.

The image component 107 is configured to capture or collect images (pictures, videos, etc.) from ambient environments of the system 100. For example, the image component 107 can collect images associated with an object-of-interest. Examples of the object-of-interest include moving creatures or moving items such as a person, a wild animal, a vehicle, a vessel, an aircraft, a sports item (e.g., a golf ball), etc. In some embodiments, the image component 107 can be a camera. In some embodiments, the image component 107 can be a video recorder. The storage component 109 is configured to store, temporarily or permanently, information/data/files/signals associated with the system 100. In some embodiments, the storage component 109 can be a hard disk drive. In some embodiments, the storage component 109 can be a memory stick or a memory card. The communication component 111 is configured to communicate with a remote device (e.g., a smartphone, a server, a database, etc.). In some embodiments, the communication component 111 can transmit and/or receive a signal from the remote device via a wired or wireless network. The battery 113 is configured to supply power to the system 100. In some embodiments, the battery 113 can be a rechargeable battery. In some embodiments, the battery 113 can be a lithium battery. In some embodiments, the audio component 114 can be configured to receive and record audio signals from surrounding environments. In such embodiments, the audio component 114 can be a microphone. In some embodiments, the audio component 114 can be configured to transmit audio signals to a user. In such embodiments, the audio component 114 can be a speaker.

In some embodiments, the external structure 103 can be a housing with multiple openings particularly designed to enable the components in the internal structure 101 to interact with a user (e.g., provide images to a user via a display), collect surrounding images (e.g., via a lens), or couple to external devices (e.g., an external battery, an external antenna, etc.). The system 100 can include several components positioned on the external structure 103 and configured to interface with the components (e.g., components 103-113) in the internal structure 101.

As shown in FIG. 1, for example, the system 100 can include a camera lens 115, a shutter button 117, a display 119, an antenna feed point 121, a power button 123, and a battery feed point 125. The camera lens 115, the shutter button 117, and the display 119 can be positioned on the external structure 103 and coupled to the image component 107. The camera lens 115 can capture images external to the system 100 and transmit them to the image component 107. The shutter button 117 is configured to receive an instruction from a user to capture images (e.g., by pressing the shutter button 117). The display 119 is configured to visually present images to a user. In some embodiments, the display 119 can be a touchscreen display that can interact with a user. As shown in FIG. 1, the display 119 can also be coupled to the storage component 109 such that the display 119 can visually present the images stored in the storage component 109 to a user. In some embodiments, the display can be a two-inch display.

As shown in FIG. 1, the system 100 can also include an antenna feed point 121, a power button 123, and a battery feed point 125. The antenna feed point 121 can be positioned on the external structure 103 and coupled to the communication component 111. The antenna feed point 121 can be coupled to an external antenna so as to enhance the signal transmission and/or reception of the communication component 111. In some embodiments, the communication component 111 can be coupled to an internal antenna (now shown) of the system 100. In some embodiments, the internal antenna can be positioned on the external structure 103.

As shown in FIG. 1, the power button 123 can be positioned on the external structure 103 and coupled to the battery 113. The power button 123 is configured to enable a user to control the power supplied by the battery 113 to the system 100. In some embodiments, for example, the power button 123 can be coupled to a switch (not shown) such that a user can turn on or turn off the system 100 by pressing the power button 123.

As shown in FIG. 1, the battery feed point 125 can be positioned on the external structure 103 and coupled to the battery 113. The battery feed point 125 is configured to couple to an external power source (not shown) so as to provide addition power to the system 100. In some embodiments, the external power source can be a portable battery. In other embodiments, the external power source can be a power socket or receptacle.

Figure 2:
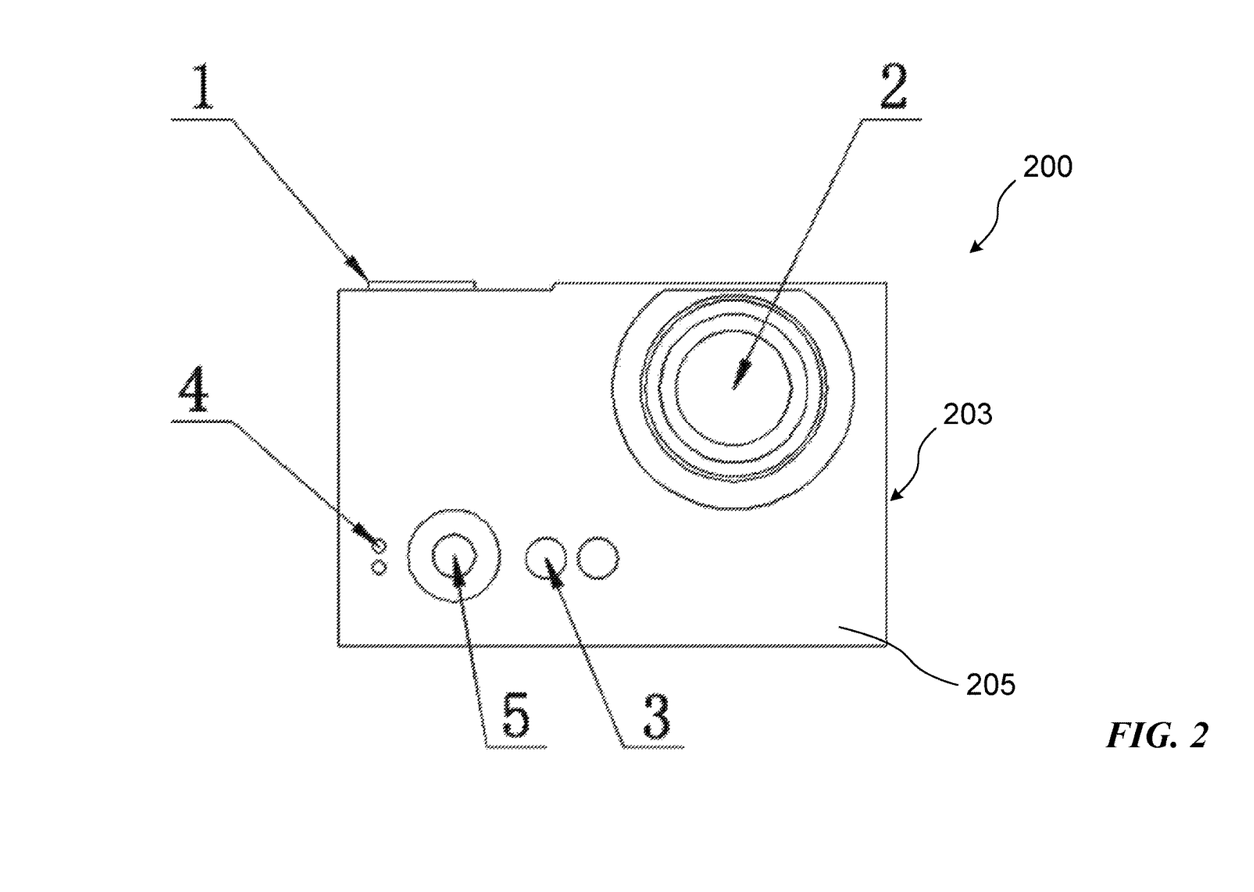
FIG. 2 is a front view of the sports camera in accordance with embodiments of the disclosed technology.

FIGS. 2-7 are schematic diagram illustrating various views of a sports camera 200 in accordance with embodiments of the disclosed technology. More particularly, FIG. 2 is a front view of the sports camera 200 in accordance with embodiments of the disclosed technology. The sports camera 200 includes an internal structure (not shown) and an external structure 203. As shown in FIG. 2, a camera lens 2 can be positioned on a front surface 205 of the external structure 203. The camera lens 2 is configured to collect images and coupled to the internal structure. The sports camera 200 includes an indicator 3 positioned on the front surface 205 of the external structure 203. The indicator 3 is configured to indicate a status of the sports camera 200. In some embodiments, for example, the indicator 3 can visually present various color of lights to reflect the status of the sports camera 200. For example, a green light can mean that the sports camera 200 functions properly. A red light can mean that one of the components inside the sports camera 200 doesn't function properly. A yellow light can mean that the sports camera 200 is running under a low level of power and needs to be charged soon.

As shown in FIG. 2, the sports camera 200 includes an antenna feed point 4 positioned on the front surface 205 of the external structure 203. The antenna feed point 4 is coupled to the internal structure and configured to further connect with an external antenna. In some embodiments, connecting to the external antenna is optional. The sports camera 200 includes a power button 5 positioned on the front surface 205 of the external structure 203. The power button 5 is coupled to the internal structure and configured to enable a user of the sports camera 200 to turn on/off the sports camera 200.

As shown in FIG. 2, the sports camera 200 includes a shutter button 1 positioned on a top surface (see also FIG. 4) of the external structure 203. The shutter button 1 is coupled to the internal structure and configured to enable a user to control an image-collection process of the sports camera 200 (e.g., start to collect image when a user presses the shutter button 1).

Figure 3:
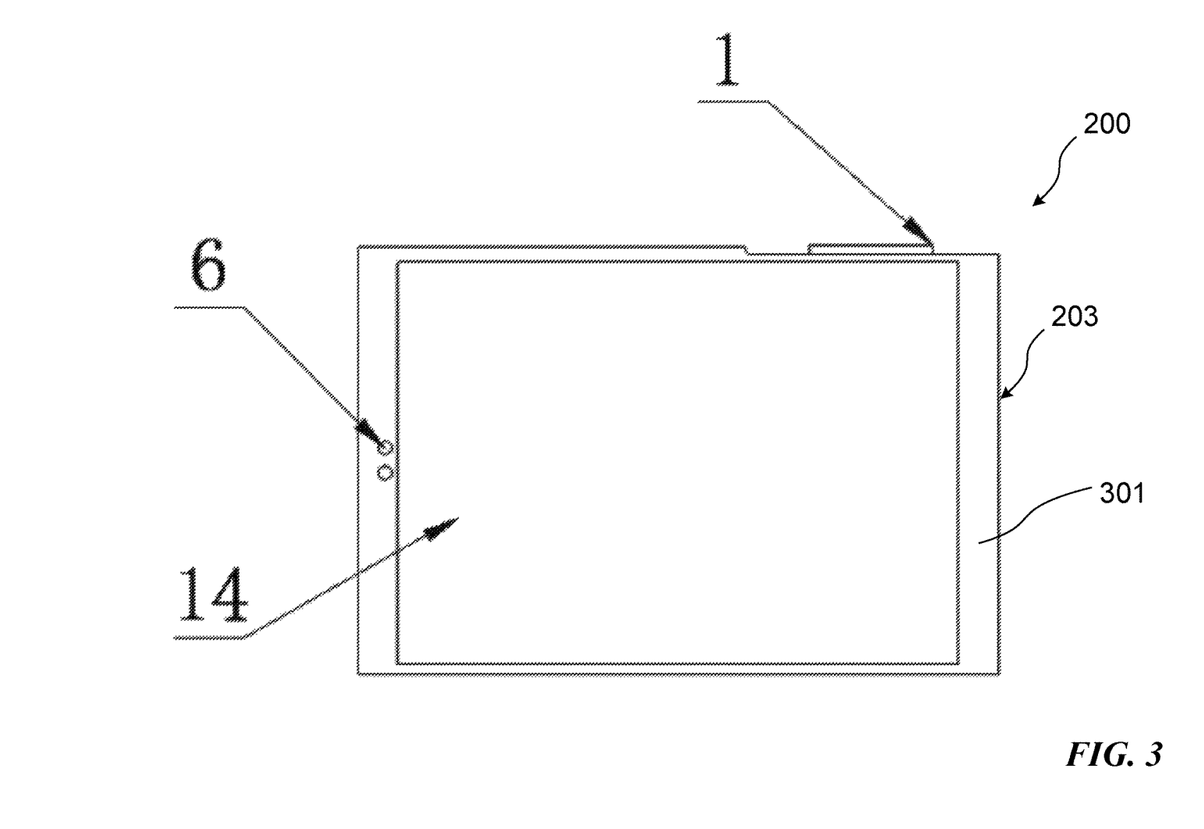
FIG. 3 is a back view of the sports camera in accordance with embodiments of the disclosed technology.

FIG. 3 is a back view of the sports camera 200 in accordance with embodiments of the disclosed technology. As shown in FIG. 3, a display 14 is positioned on a back surface 301 of the external structure 203. In the illustrated embodiment, the display 14 occupies most of the area of the back surface 301. In some embodiments, the display 14 can be sized to occupy 95% area of the back surface 301. In other embodiments, the display 14 can have various sizes depending on different designs. The relatively-large display design enhances the visibility of the display 14 especially when the sports camera 200 is moving. The display 14 provides a user interface allowing a user to interact with the sports camera 200. In some embodiments, the display 14 can be a touchscreen display. In some embodiments, the display 14 is a Liquid Crystal Display (LCD).

As shown in FIG. 3, the sports camera 200 can include a battery feed point 6 positioned on the back surface 301 of the external structure 203. The battery feed point 6 is configured to couple to an external power source (not shown) so as to provide addition power to the sports camera 200. In the illustrated embodiment, the battery feed point 6 is positioned on an edge of the back surface 301 and adjacent to the display 14. In other embodiments, the battery feed point 6 can be positioned at other places of the external structure 203.

Figure 4:
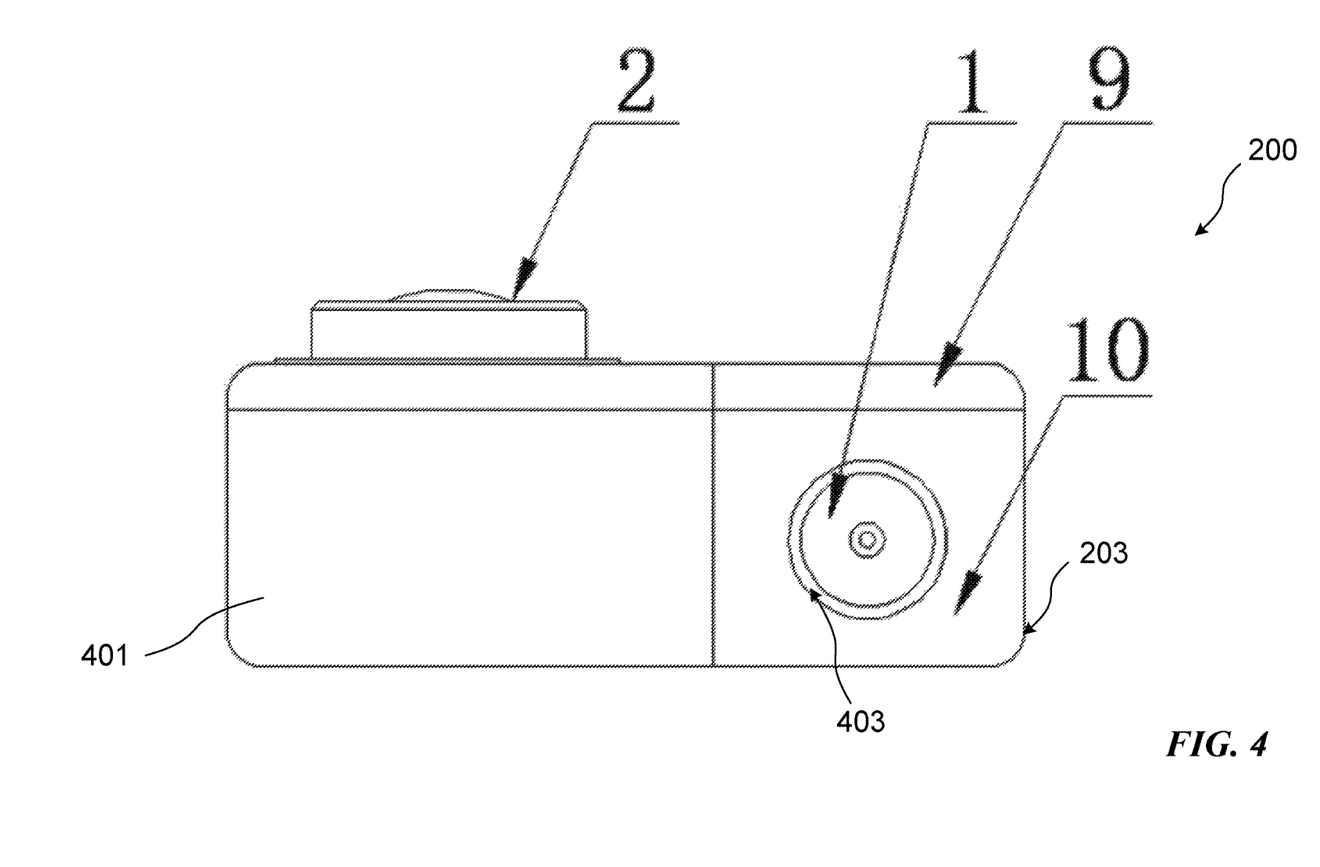

FIG. 4 is a top view of the sports camera 200 in accordance with embodiments of the disclosed technology. As shown in FIG. 4, the external structure 203 can include a front housing 9 and a back housing 10. The external structure 203 of the sports camera 200 includes a top surface 401. As shown in FIG. 4, the shutter button 1 is positioned on the back housing 10 of the external structure 203. In other embodiments, the shutter button can be positioned on the front housing 9. As shown in FIG. 4, the sports camera 200 can include a circular component 403 circumferentially positioned around the shutter button 1. The circular component 403 is configured to facilitate a user to locate the shutter button 1. For example, in some embodiments, the circular component 403 can be made of a fluorescent material such that a user can easily locate the shutter button 1 in places with limited lighting. In some embodiments, the circular component 403 can be a transparent plastic component that allows light to pass through. In such embodiments, the sports camera 200 can include one or more lighting device (e.g., a Light Emitting Diode (LED) device) positioned inside the external structure 203 and adjacent to the circular component 403 such that a user can locate the shutter button 1 by the light emitted from the lighting device.

Figure 5:
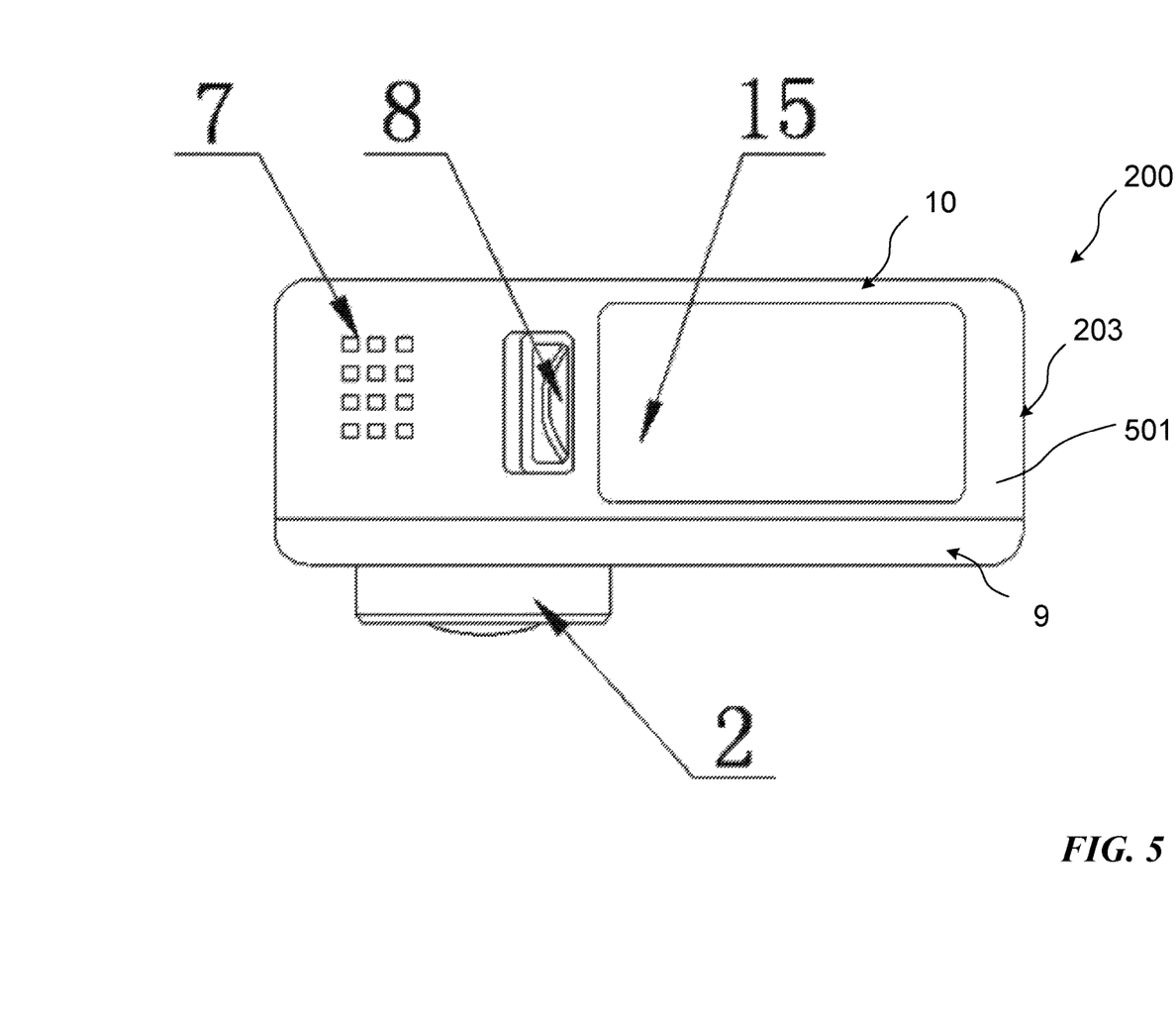
FIG. 5 is a bottom view of the sports camera in accordance with embodiments of the disclosed technology.

FIG. 5 is a bottom view of the sports camera 200 in accordance with embodiments of the disclosed technology. As shown in FIG. 5, the external structure 203 can include the front housing 9 and the back housing 10. The external structure 203 of the sports camera 200 includes a bottom surface 501. As shown, a pattern 7 is formed on the bottom surface 501. The pattern 7 provides a gripping area for a user of the sports camera 200 such that the user can tightly hold the sports camera 200 when he/she operates the sports camera 200. In some embodiments, the pattern 7 includes a plurality of openings formed with the external structure 203. In some embodiments, the plurality of openings can be square openings. In other embodiments, the openings can have various shapes depending on different designs. In some embodiments, the plurality of openings can be configured as speaker/microphone openings. In such embodiments, a speaker (or microphone) can be positioned adjacent to these openings inside the external structure 203, so as to allow the speaker (or microphone) to transmit (or receive) audio signals through the openings. In some embodiments, the pattern 7 can be arranged as an array.

In the embodiments illustrated in FIG. 5, the sports camera 200 includes a battery button 8 and a battery chamber cover 15 positioned on the bottom surface 501 of the external structure 203. The battery button 8 is coupled to the battery chamber cover 15. When a user pushes the battery button 8, the battery chamber cover 15 will be opened such that the user can insert a battery to (or remove one from) a battery chamber inside the sports camera 200. In some embodiments, when a user moves the battery button 8, the battery chamber cover 15 is moved in response to the movement of the battery button 8. The battery chamber cover 15 then forms a gap with the external structure 203, through which the user can insert a battery to (or remove one from) the sports camera 200.

In the illustrated embodiments in FIG. 5, the pattern 7, the battery button 8, and the battery chamber cover 15 are positioned on the back housing 10 of the external structure 203, and the camera lens 2 is positioned on the front housing 9 of the external structure 203. In other embodiments, however, the pattern 7, the battery button 8, and the battery chamber cover 15 can be positioned on the front housing 9.

Figure 6:
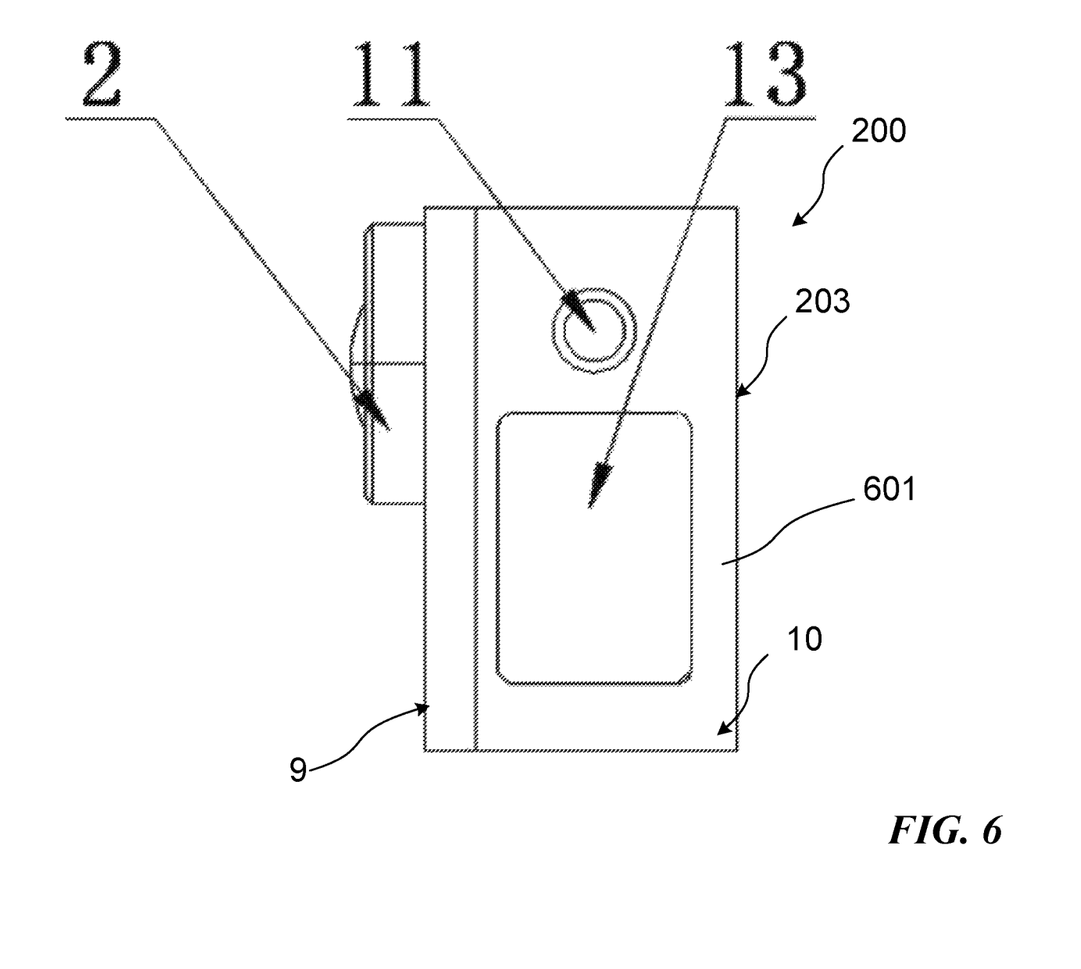
FIG. 6 is a side view of the sports camera in accordance with embodiments of the disclosed technology.

FIG. 6 is a side view of the sports camera 200 in accordance with embodiments of the disclosed technology. As shown, the sports camera 200 includes a network switch button 11 and an interface portion 13 positioned on a first side surface 601 of the external structure 203. The network switch button 11 enables a user to select a network (e.g., a WiFi network, a 3G/4G network, etc.) that is used to communicate with a remote device (e.g., a smartphone, a server, a database, etc.). The interface portion 13 is electrically coupled to the internal structure of the sports camera 200. In some embodiments, the interface portion 13 can include multiple sockets, terminals, or receptacles for data or power transmission. In some embodiments, the interface portion 13 includes a Universal Serial Bus (USB) socket. In some embodiments, the interface portion 13 includes an IEEE 1394 socket. In the illustrated embodiments in FIG. 6, the network switch 11 and the interface portion 13 are positioned on the back housing 10 of the external structure 203. In other embodiments, however, the network switch 11 and the interface portion 13 can be positioned on the front housing 9.

Figure 7:
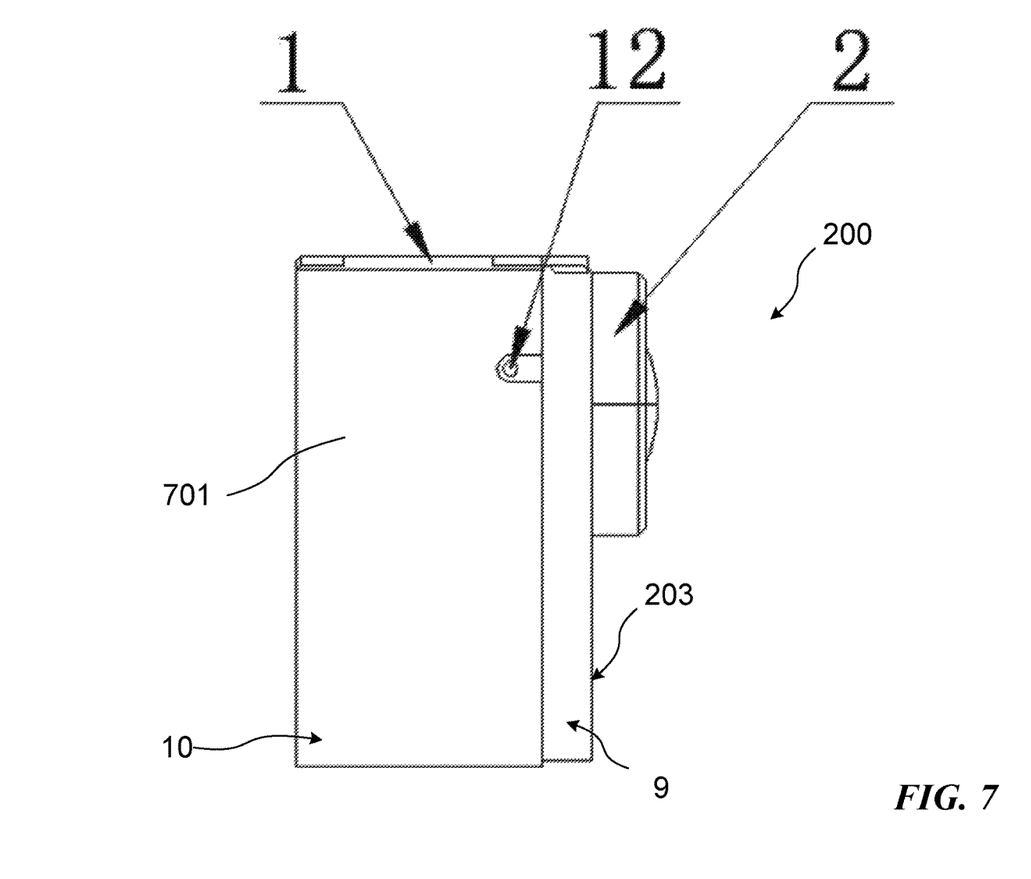
FIG. 7 is another side view of the sports camera in accordance with embodiments of the disclosed technology.

FIG. 7 is another side view of the sports camera 200 in accordance with embodiments of the disclosed technology. As shown, the sports camera 200 includes a microphone socket 12 positioned on a second side surface 701 of the external structure 203. The microphone socket 12 enables a user to plug an external microphone therein. In some embodiments, the sports camera 200 can include an internal microphone (not shown). The microphone socket 12 is coupled to an audio receiving component (now shown) of the sports camera 200. The audio receiving component is configured to receive audio signals and store received audio signals. In some embodiments, the audio receiving component receives audio signals when the sports camera 200 is turned on. In other embodiments, the audio receiving component receives audio signals when the sports camera 200 collects images. In the illustrated embodiments in FIG. 7, the microphone socket 12 is positioned on the back housing 10 of the external structure 203. In other embodiments, however, the microphone socket 12 can be positioned on the front housing 9.

Although the present technology has been described with reference to specific exemplary embodiments, it will be recognized that the present technology is not limited to the embodiments described but can be practiced with modification and alteration within the spirit and scope of the appended claims. Accordingly, the specification and drawings are to be regarded in an illustrative sense rather than a restrictive sense.

The invention claimed is:

1. A camera system, comprising:
    an internal structure having a processor, an image component coupled to the processor, and a storage device coupled to the processor, wherein the internal structure is formed with a battery chamber configured to accommodate a battery;
    an external structure having a front housing and a back housing, wherein the front housing is coupled to the back housing;

a camera lens positioned on the front housing and coupled to the image component;

an antenna feed point positioned on the front housing and configured to be operably coupled to an external antenna, wherein the antenna feed point is positioned on an edge of the front housing;

a power button positioned on the front housing and electrically coupled to the battery, wherein the power button is positioned between the antenna feed point and the camera lens;

a battery feed point positioned on the back housing and configured to be operably coupled to an external battery, wherein the battery feed point is electrically coupled to a battery;

a display positioned on the back housing and configured to visually present an image collected by the camera lens; and a pattern positioned on the back housing and configured to provide a gripping area.

2. The system of claim 1, wherein the display is a liquid crystal display, and wherein the liquid crystal display is positioned in a first area on a back surface of the back housing, and wherein first area occupies at least 95 percent of the back surface of the back housing.

3. The system of claim 2, wherein the battery feed point is positioned in a second area of the back surface of the back housing, and wherein the second area is adjacent to the first area.

4. The system of claim 1, further comprising an indicator light positioned on the front housing and configured to visually present a status of the system to a user, where the indicator light is positioned between the power button and the camera lens.

5. The system of claim 1, further comprising a shutter button positioned on a top surface of the back housing, wherein the shutter button is electrically coupled to the processor and the image component.

6. The system of claim 1, further comprising:
a battery button positioned on a bottom surface of the back housing; and
a battery chamber cover coupled to the battery button and positioned on the bottom surface of the back housing, wherein when a user moves the battery button, the battery chamber cover is moved in response to the movement of the battery button and the battery chamber cover forms a gap with the back housing.

7. The system of claim 1, further comprising an interface portion positioned on a side surface of the back housing, wherein the interface potion is electrically coupled to the internal structure.

8. The system of claim 1, wherein the pattern is positioned on a bottom surface of the back housing, and wherein the pattern includes a plurality of openings formed with the back housing.

9. The system of claim 8, wherein the plurality of openings are square openings.

10. The system of claim 1, wherein the pattern is a square pattern.

11. The system of claim 8, further comprising an audio component positioned inside the back housing and adjacent to the plurality of openings.

12. The system of claim 1, further comprising a network switch button positioned on a side surface the back housing and configured to enable a user to select a network used to communicate with a remote device.

13. The system of claim 1, further comprising an audio socket positioned on a side surface of the back housing and configured to be operably coupled to an audio component.

14. The system of claim 13, wherein the audio component includes a microphone.

15. A camera system, comprising:
an image component configured to collect an image;
a storage component configured to store the image;
a front housing configured to enclose the image component and the storage component;
a back housing configured to enclose the image component and the storage component and coupled to the front housing;
a camera lens positioned on the front housing and coupled to the image component;
an antenna feed point positioned on the front housing and configured to be operably coupled to an external antenna, wherein the antenna feed point is positioned on an edge of the front housing;
a power button positioned on the front housing between the antenna feed point and the camera lens;
a battery feed point positioned on the back housing and configured to be operably coupled to an external battery, wherein the battery feed point is electrically coupled to a battery;
a display positioned on the back housing and configured to visually present the image collected by the camera lens; and
a plurality of square openings formed on a bottom surface of the back housing, wherein the plurality of openings together form a square pattern on the bottom surface of the back housing.

16. The system of claim 15, wherein the display is a liquid crystal display, and wherein the liquid crystal display is positioned in a first area on a back surface of the back housing, and wherein the battery feed point is positioned in a second area of the back surface of the back housing, and wherein the second area is adjacent to the first area.

17. The system of claim 15, further comprising an indicator light positioned on the front housing and configured to visually present a status of the system to a user, where the indicator light is positioned between the power button and the camera lens.

18. The system of claim 15, further comprising:
a shutter button positioned on a top surface of the back housing, wherein the shutter button is electrically coupled to the image component;
a battery button positioned on a bottom surface of the back housing; and
a battery chamber cover coupled to the battery button and positioned on the bottom surface of the back housing, wherein when a user moves the battery button, the battery chamber cover is moved in response to the movement of the battery button and the battery chamber cover forms a gap with the back housing.

19. A housing apparatus for accommodating a camera device, comprising:
a first housing having a first surface;
a second housing coupled to the first housing, the second housing having a top surface, a second surface, and a bottom surface;
a camera lens positioned on the first surface;
an antenna feed point positioned on the first surface, wherein the antenna feed point is positioned on an edge of the first surface;
a power button positioned on the first surface between the antenna feed point and the camera lens;

a battery feed point positioned on the second surface and configured to be electrically coupled to a battery;

a display positioned on the second surface and configured to visually present an image collected by the camera lens;

a pattern positioned on the bottom surface and configured to provide a gripping area; and a shutter button positioned on the top surface and electrically coupled to the camera lens.

20. The apparatus of claim 19, further comprising:

an interface portion positioned on a side surface of the second housing; and a network switch button positioned on the side surface and configured to enable a user to select a network used to communicate with a remote device.

\* \* \* \* \*